No. 822,251. PATENTED JUNE 5, 1906.
J. W. DENMEAD.
MACHINE FOR MAKING MATCH BOXES.
APPLICATION FILED SEPT. 23, 1904.

5 SHEETS—SHEET 1.

WITNESSES:
John H. Tenney
M. C. Hayes

INVENTOR
John W. Denmead
BY
John F. Nolan
ATTORNEY

No. 822,251. PATENTED JUNE 5, 1906.
J. W. DENMEAD.
MACHINE FOR MAKING MATCH BOXES.
APPLICATION FILED SEPT. 23, 1904.

5 SHEETS—SHEET 2.

No. 822,251. PATENTED JUNE 5, 1906.
J. W. DENMEAD.
MACHINE FOR MAKING MATCH BOXES.
APPLICATION FILED SEPT. 23, 1904.

5 SHEETS—SHEET 5.

WITNESSES:
John H. Tenny
M. Hayes

INVENTOR
John W. Denmead
BY John R. Nolan
ATTORNEY

UNITED STATES PATENT OFFICE.

JOHN W. DENMEAD, OF AKRON, OHIO, ASSIGNOR TO THE DIAMOND MATCH COMPANY, OF NEW YORK, N. Y., A CORPORATION OF ILLINOIS.

MACHINE FOR MAKING MATCH-BOXES.

No. 822,251.     Specification of Letters Patent.     Patented June 5, 1906.

Application filed September 23, 1904. Serial No. 225,600.

*To all whom it may concern:*

Be it known that I, JOHN W. DENMEAD, a citizen of the United States, and a resident of Akron, in the county of Summit and State of Ohio, have invented certain new and useful Improvements in Machines for Making Match-Boxes, of which the following is a specification.

This invention relates to machines wherein the shucks or slides of match-boxes are automatically formed and a frictional or striking surface applied thereto, having reference more particularly to that class of machines in which the shucks or slides are formed about a suitable bar or mandrel and advanced therealong to appropriate mechanism for applying and affixing sand or other gritty substance to the edge or edges of each shuck or slide.

The present invention comprehends means for efficiently presenting the edge or edges of the shuck to the surface-applying mechanism and includes, among other features of construction and combinations of devices, a novel formation of mandrel on which the traveling shuck is automatically positioned, as will be hereinafter fully described and claimed.

Figure 1:
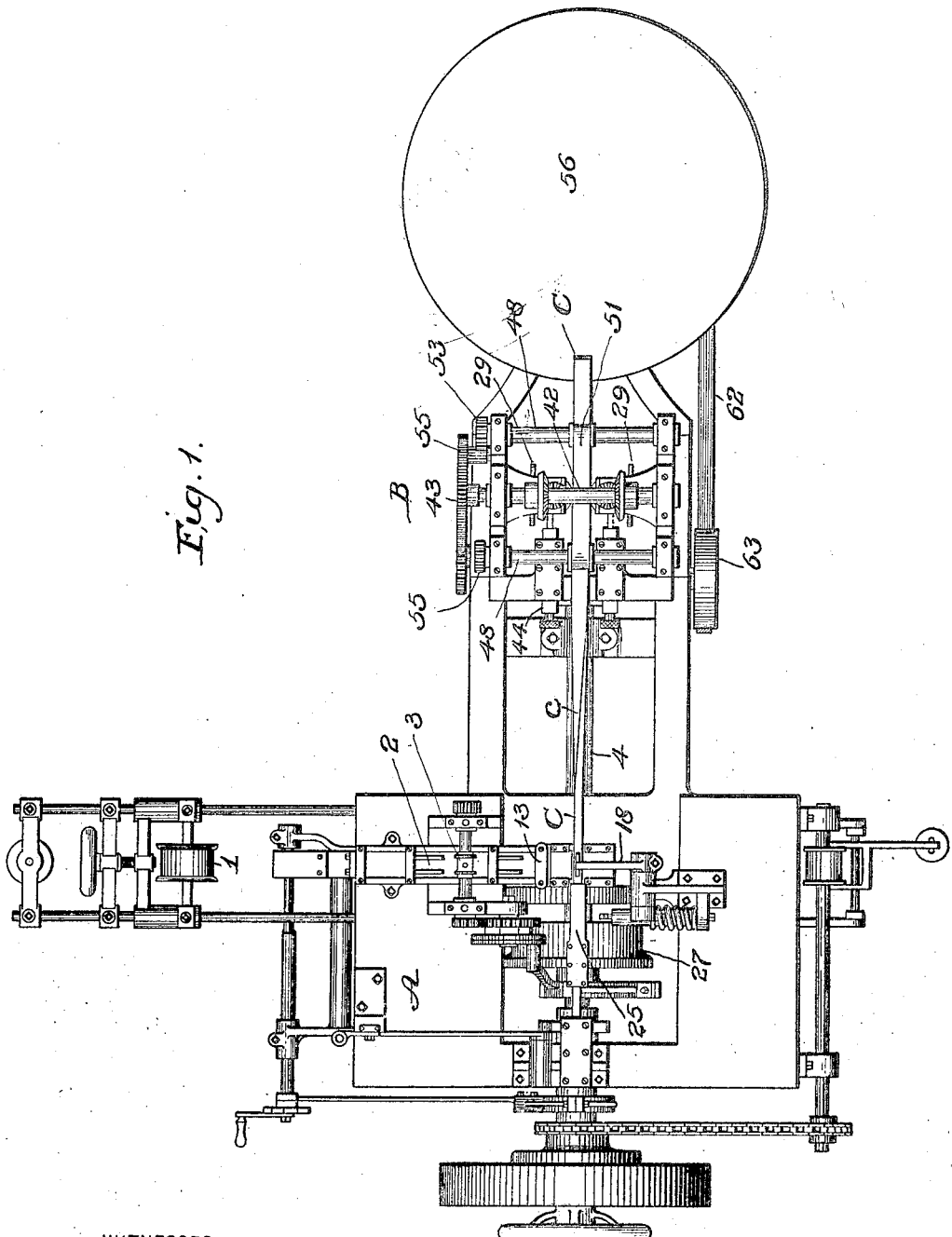
Figure 2:
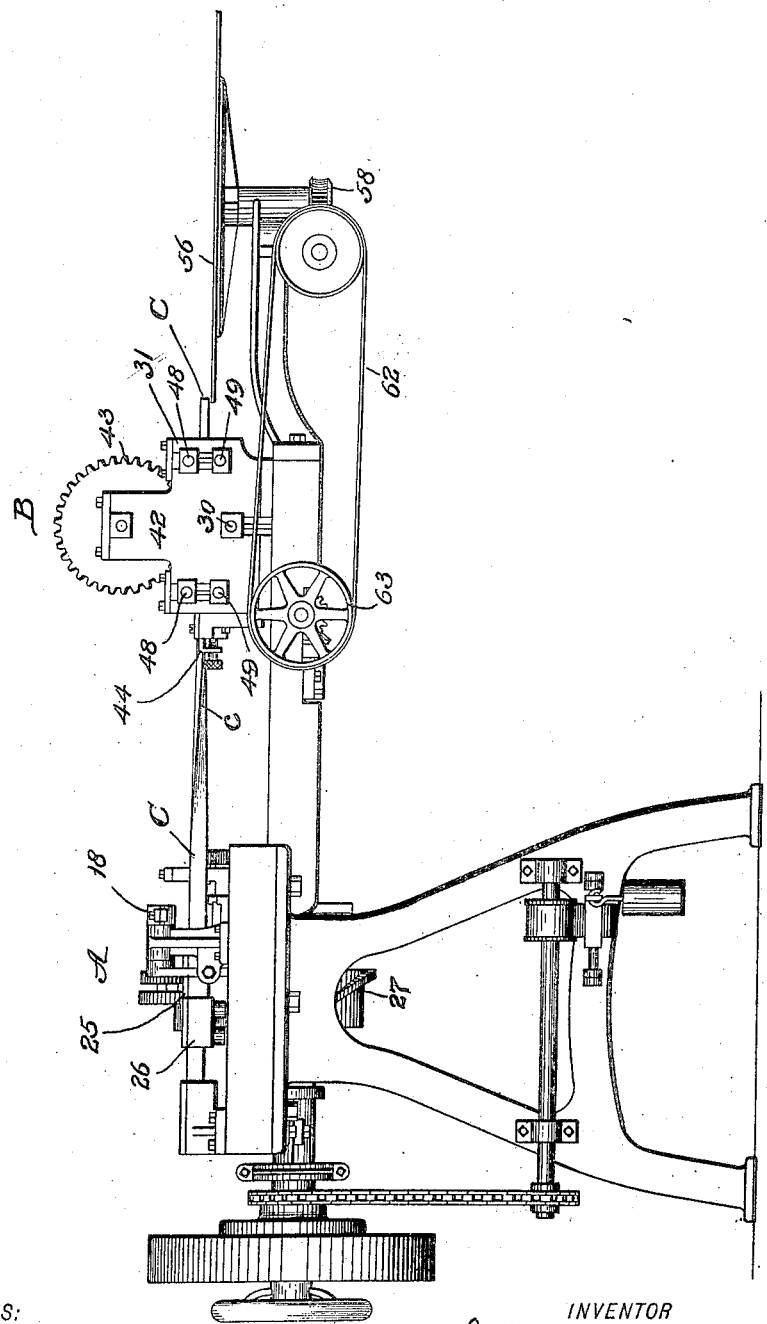
Figure 3:
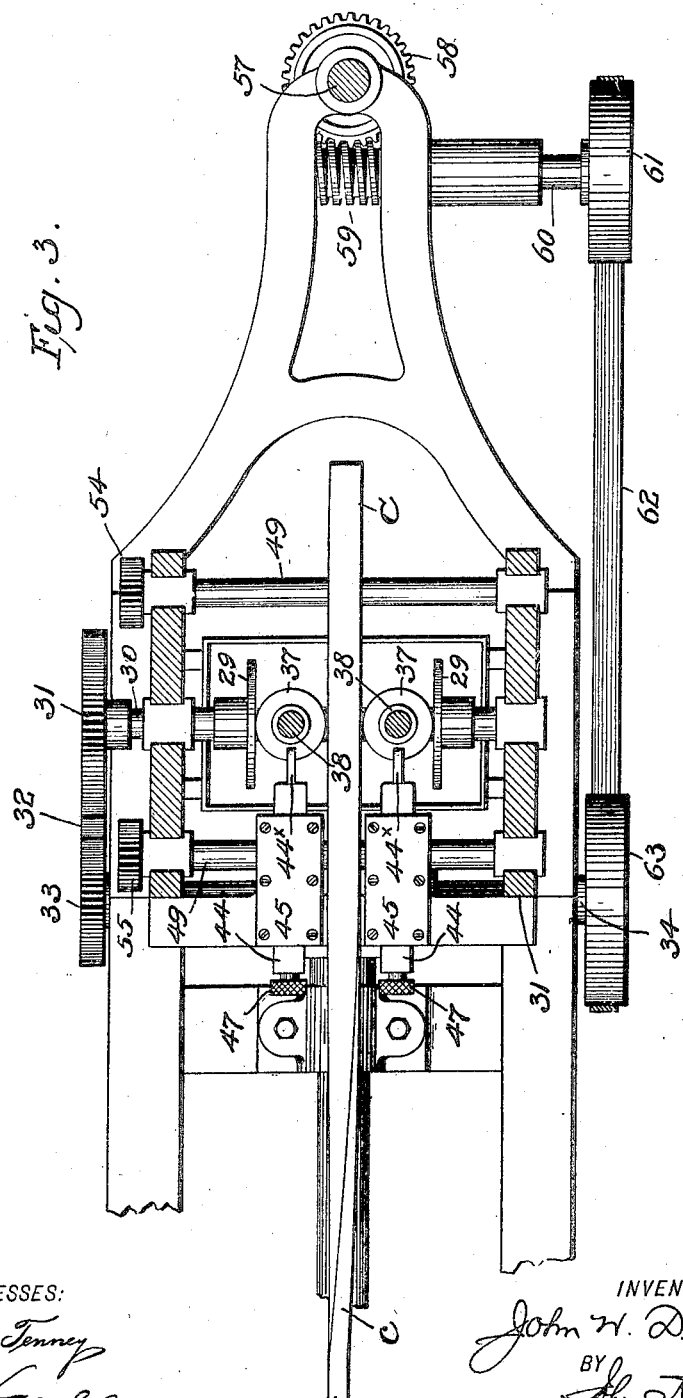
Figure 4:
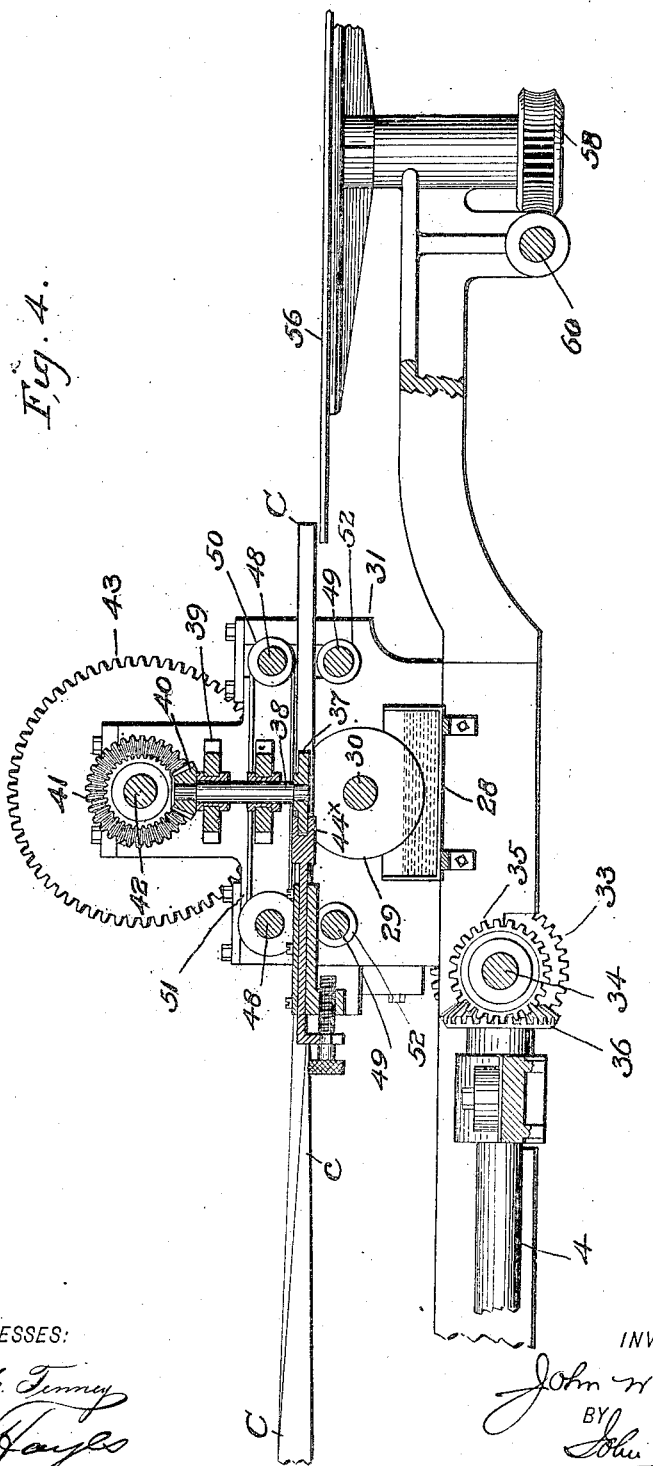
Figure 5:
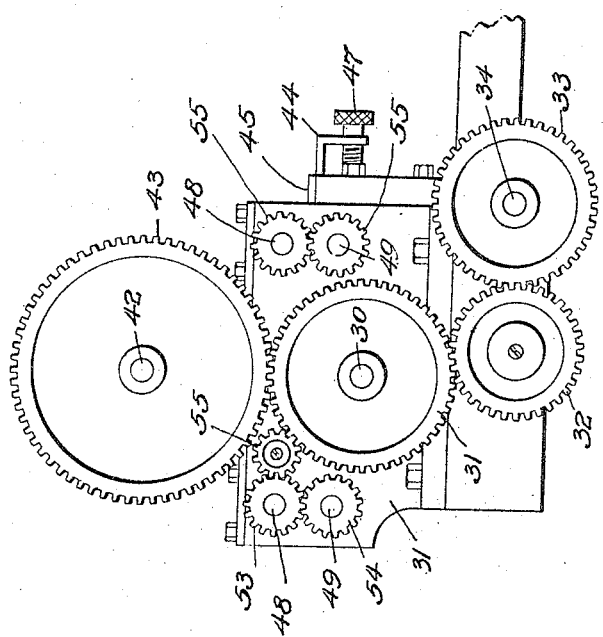
Figure 6:
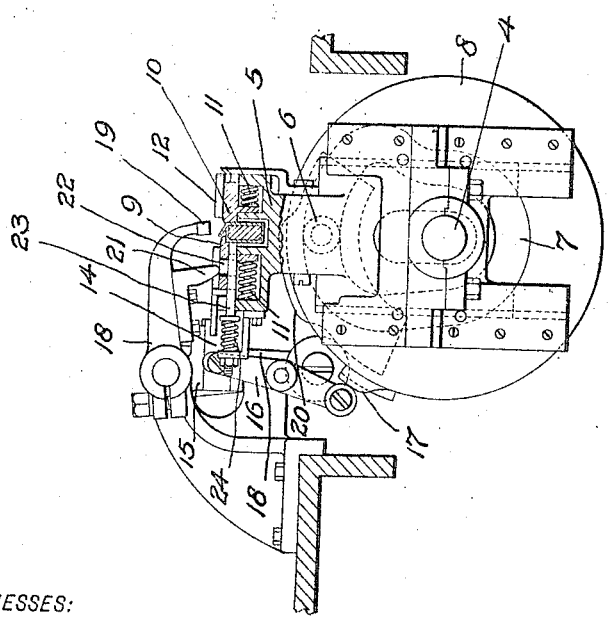

In the drawings, Figure 1 is a plan of a machine embodying the preferred form of my invention, only so much of the shuck-making mechanism being shown as is necessary to illustrate the improvement. Fig. 2 is a side elevation of the machine. Fig. 3 is a horizontal section of the surface-applying end of the machine, taken on a plane immediately above the mandrel. Fig. 4 is a sectional side elevation of the same end of the machine. Fig. 5 is an elevation of the gearing on one side of the surface-applying mechanism. Fig. 6 is a transverse section through a portion of the shuck-making mechanism, illustrating devices for forming the shuck on the mandrel.

A represents the shuck-making mechanism, and B the surface-applying mechanism, the whole being mounted upon a suitable supporting-frame. Extending from one mechanism to the other and constituting, in effect, an element of each is a mandrel C, around which the paper-stock is folded to form a shuck, and along which mandrel such shuck is fed to the surface-applying mechanism and thence discharged from the mandrel. This mandrel is of novel construction, as will hereinafter appear.

The mechanism herein illustrated for forming the shuck about the mandrel need not be specifically described, as the same is fully set out in a pending application for Letters Patent of the United States, Serial No. 3,360, filed January 30, 1900. Briefly explained, the strip of stock to be converted into shucks is passed from a reel 1 to the mandrel by way of a suitable guide or trough 2, glue being applied along one edge of the strip to unite the edges thereof when they have been overlapped upon the mandrel. The strip is fed to the mandrel by a pair of coacting rolls 3, to which intermittent motion is imparted from the main shaft 4 of the machine through appropriate intervening devices.

Beneath the mandrel is a vertically-reciprocating head 5, which is actuated through its connection, by means of a stud or roller 6, with a cam-groove 7 in the face of a disk 8, fast on the main shaft. The upper end of the head is slotted to embrace the mandrel when the head is at the limit of its upper stroke, and such end on the respective sides of the slot is provided with horizontally-movable plates 9 10, which constitute folders. The inner ends of these folders are normally projected into the slot by means of suitable springs 11. On the head are flanges 12, which, being in line with the trough 2 when the head is in its down position, serve to guide the paper-stock over and upon the folders. At the side of the head is a knife 13, by which on the ascent of the head the portion of stock to form the shuck is cut off. Thereupon such portion by the continued ascent of the head impinges against and is folded upon the bottom and two sides of the mandrel. The two folders contacting with the sides of the blank on the mandrel are forced outward thereby; yet at the same time applying yielding pressure to the sides of the blank and maintaining them against the mandrel. These sides project above the top of the mandrel, and the projecting portions are next folded one upon the other by the inward movement in succession of the two folders. The folder 9 is first moved through the instrumentality of a slide 14, which engages the outer end of such folder. This slide is mounted in a horizontal guide 15 and is pivotally connected with one arm of a lever 16, the other arm of which extends into the path of an appropriate cam 17 on the periphery of the disk 8. The folder 9 is moved sufficiently to fold the opposed edge of the blank down upon the mandrel; but the succeeding action of the folder 10 upon its opposed edge of the blank is such as only partially to fold such edge upon the underlying flap.

A presser-lever 18, which is fulcrumed on a bracket on the main frame, next acts upon the partially-folded flap to press it securely down upon the underlying flap. The upper arm of this lever carries a shoe 19 to engage the flap, while the other arm depends into the path of a cam 20 on the disk. Such upper arm is provided with a depending finger 21, which by the movement of the lever is swung into or out of an orifice 22 in the folder 9, the finger when moved into the orifice retracting said folder sufficiently to remove its inner end from beneath the partially-turned flap when the latter is pressed down by the lever.

A horizontal bar 23 is mounted in the head 5 directly below the folder 9, the inner end of which bar is maintained yieldingly against the blank close to the top of the mandrel by means of a suitably-disposed spring 24, thereby holding the blank in place during the withdrawal of the folder 9. After its formation upon the mandrel, as above described, the shuck is moved along the same toward the surface-applying mechanism by means of a slide 25, which is carried by a head 26, fitted upon the mandrel. This slide is connected with and reciprocated by a cam 27 on the main shaft. The slide advances the shuck a sufficient distance along the mandrel to permit the formation of a new shuck upon the latter, and this new shuck being similarly advanced by the slide pushes the leading shuck farther along, and so on as each shuck is formed and fed along the mandrel it pushes onward the previously-formed shucks.

It will be understood, of course, that the form in cross-section of the mandrel is the same as that of the shuck to be produced. Inasmuch as the folded glued portions of the shuck are along one of the edges of the shuck and as such folding is effected upon the top of the mandrel, I have given to the body of the mandrel at a point beyond that where the shuck is formed thereon a longitudinal twist $c$ of such pitch as gradually to turn the shucks a quarter-turn as they are progressively moved along the mandrel, and thereby to dispose the edges of the shuck in vertical position. Thence the shucks are fed along the mandrel to mechanism for applying the surfacing substance, in the form of a paint, to the vertically-disposed edges of the shuck. This mechanism is of the following construction: Supported upon the main frame, directly below the free end of the mandrel, is a receptacle 28, containing a suitable paint or liquid composition, having incorporated therewith sand or other gritty matter. Extending into the receptacle is a pair of disks 29, which are mounted on a shaft 30, having its bearings in a housing 31 on the main frame. These disks, as will be observed, lie beyond the respective lateral edges of the mandrel and extend above the horizontal plane of the latter. One end of the shaft 30 is provided with a gear-wheel $31^a$, which coacts with an idler 32 in mesh with a wheel 33 on a transverse shaft 34 in the framework. The shaft 34 carries a bevel-wheel 35, which gears with a similar wheel 36 on the driving-shaft 4. Thus the power is transmitted from the driving-shaft to the shaft 30, and the disks on the latter are thereby revolved in a manner to dip into the liquid contents of the receptacle and carry upward on their respective faces thin layers or films of the composition.

Interposed between the disks and the respective opposing sides of the mandrel are two horizontally-disposed disks 37, the peripheries of which revolve against the opposing faces of the disks 29, and thereby receive the composition and apply it uniformly to the opposing edges of the shuck.

The composition-applying disks are positively rotated in unison with the disks 29, and to this end the latter disks are mounted on the lower ends of the vertical shafts 38, having their bearings in brackets 39 on the housing. On the upper ends of these shafts 38 are bevel-wheels 40, which coact with similar wheels 41 on a transverse shaft 42, having its bearings in the housing, the shaft 42 being provided at one end with a spur-wheel 43, which gears with and is driven by the wheel 31 on the shaft 30.

In order to determine the thickness of the layer of composition applied to the shucks by the disks 37, an adjustable scraper 44 is applied to each of the latter. Each scraper comprises a bar having a bifurcated end portion $44^x$, which embraces the disk. This bar is slidingly fitted to a guide 45 on a cross-piece of the housing, being provided at its outer end with a depending lug through which passes a set-screw 47, extending from a tapped portion of the cross-piece. By properly manipulating this screw the scraper may be moved toward or from the disk in a manner to vary the space between the periphery of the disk and the bifurcated portion of the bar, and thereby regulate to a nicety the quantity of material carried by the disk.

To insure the positive and uniform feeding of the shucks along the mandrel during the application of the frictional composition thereto, I mount within the housing, above and below the mandrel, respectively, two pairs of positively-driven shafts 48 49, whereof the upper pair is provided with rollers 50, around which passes an endless band 51, that takes upon the upper face of the shuck, and whereof the lower pair is provided with rollers 52, that take against the under side of the shuck. The rearward shafts of each pair are provided with coacting gear-wheels 53 54, respectively, and an idler 55 is interposed between the wheel 53 and the wheel 31 on the shaft 30. Thus the shafts 48 49 are positively driven, and the motion is transmitted by means of the band from the rearward upper to the forward upper shaft. The latter shaft is geared with the underlying shaft 49 by the gear-wheels 55, and hence the several shafts are operated concertedly.

When the shuck has been "painted," as above described, it is delivered from the free end of the mandrel onto a revolving table 56, from which it may be removed by an attendant. This table is carried by a vertical shaft 57, which has its bearing at the end of the main frame. On the lower end of the shaft 57 is a worm-wheel 58, with which engages a worm 59 on a transverse shaft 60, the latter being provided at one end with a pulley 61, which is connected, by means of a belt 62, with a pulley 63 on the shaft 34. Thus the table is slowly rotated, and as the shucks are successively discharged from the mandrel they pass onto the table at intervals.

I claim—

1. The combination with a twisted mandrel upon which shucks are formed, of means for feeding the shucks along said mandrel whereby the said shucks are partially turned during their traverse.

2. The combination with shuck-forming mechanism and surface-applying mechanism, of means for feeding the shucks from the former to the latter mechanism, and means for turning said shucks to present a surface thereof to said latter mechanism.

3. The combination with a twisted mandrel upon which shucks are formed, of surface-applying mechanism adjacent said mandrel, and means for feeding the shucks along the mandrel to said mechanism.

4. The combination with shuck-forming mechanism and surface-applying mechanism, of a twisted mandrel extending from the former to the latter mechanism, and means for feeding the shucks along said mandrel.

5. The combination with shuck-forming mechanism and surface-applying mechanism, including a composition-receptacle, and means for removing the composition therefrom and applying it to the vertical edge or edges of a shuck, of a twisted mandrel extending from the shuck-forming to the surface-applying mechanism, and means for feeding the shucks along said mandrel.

6. The combination with a twisted mandrel upon which shucks are supported and partially turned, of surface-applying mechanism, and means for bearing upon and advancing said shucks during the application of the surface substance thereto.

7. The combination with a twisted mandrel upon which shucks are supported and partially turned, of a surface-applying mechanism, an endless band bearing upon and advancing said shucks during the application of the surface substance thereto, and means for supporting and actuating said band.

8. The combination with a twisted mandrel upon which shucks are supported and partially turned, of a surface-applying mechanism, and means for advancing said shucks during the application of the surface substance thereto, said means including an endless band bearing against the upper side of the shuck and rollers bearing against the under side of the shuck, and devices for supporting and actuating said band and rollers.

Signed at Barberton, in the county of Summit and State of Ohio, this 10th day of September, A. D. 1904.

JOHN W. DENMEAD.

Witnesses:
  B. C. Ross,
  F. M. Root.